United States Patent
McMickell et al.

(10) Patent No.: US 8,312,782 B2
(45) Date of Patent: Nov. 20, 2012

(54) CONTROL MOMENT GYROSCOPE BASED MOMENTUM CONTROL SYSTEMS IN SMALL SATELLITES

(75) Inventors: Brett McMickell, Scottsdale, AZ (US); Paul Buchele, Glendale, AZ (US); Gary Lynwood Gisler, Granbury, TX (US); James Andrus, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 572 days.

(21) Appl. No.: 12/639,647

(22) Filed: Dec. 16, 2009

(65) Prior Publication Data

US 2010/0320330 A1 Dec. 23, 2010

Related U.S. Application Data

(60) Provisional application No. 61/218,291, filed on Jun. 18, 2009.

(51) Int. Cl.
*G01C 19/06* (2006.01)
(52) U.S. Cl. .................. 74/5.37; 74/5.4; 74/5.7
(58) Field of Classification Search .......... 74/5.34, 74/5.37, 5.4, 5.7
See application file for complete search history.

(56) References Cited

U.S. PATENT DOCUMENTS

| | | | | |
|---|---|---|---|---|
| 2,371,368 A | * | 3/1945 | Wallace | 180/8.1 |
| 3,267,745 A | * | 8/1966 | Smead et al. | 74/5.4 |
| 3,269,024 A | * | 8/1966 | Fischer et al. | 33/301 |
| 3,452,948 A | * | 7/1969 | Chang et al. | 244/165 |
| 3,741,500 A | | 6/1973 | Liden | |
| 3,787,100 A | | 1/1974 | Habermann et al. | |
| 4,061,043 A | | 12/1977 | Stiles | |
| 4,125,017 A | | 11/1978 | Dhuyvetter et al. | |
| 4,292,854 A | | 10/1981 | Liebing | |
| 4,825,716 A | | 5/1989 | Roberts et al. | |
| 4,989,466 A | | 2/1991 | Goodman | |

(Continued)

FOREIGN PATENT DOCUMENTS

EP 2060810 A1 5/2009

(Continued)

OTHER PUBLICATIONS

EP Search Report, EP 10159255.8-2422 dated Nov. 18, 2010.

*Primary Examiner* — Ha D. Ho
(74) *Attorney, Agent, or Firm* — Ingrassia Fisher & Lorenz, P.C.

(57) ABSTRACT

A self-contained momentum control system (MCS) for a spacecraft is provided for small satellites. The MCS features a miniaturized gyroscopic rotor with a rotational speed in excess of 20,000 RPM. The MCS includes at least three control moment gyroscopic mechanical assemblies (CMAs) rigidly mounted within a single enclosure, where each CMA mounted in an orientation whereby the longitudinal axis of each CMA is either orthogonal to every other CMA or is parallel to another CMA but in the opposite orientation. In order to further reduce the size of the MCS, an electronics package that is configured to interface command and control signals with and to provide power to the CMAs is included within the MCS enclosure. A plurality of shock isolation devices are used to secure each of the CMAs to the enclosure in order to reduce the launch load upon the CMAs thereby allowing the use of smaller rotor spin bearings. The MCS enclosure surrounding the CMAs and support structure is hermetically sealed.

20 Claims, 10 Drawing Sheets

U.S. PATENT DOCUMENTS

| | | | |
|---|---|---|---|
| 5,297,052 A | | 3/1994 | McIntyre et al. |
| 5,315,158 A | | 5/1994 | Danielson |
| 5,363,700 A | | 11/1994 | Joly et al. |
| 5,611,505 A | * | 3/1997 | Smay .......................... 244/165 |
| 5,820,079 A | | 10/1998 | Harrell |
| 6,305,647 B1 | | 10/2001 | Defendini et al. |
| 6,340,137 B1 | | 1/2002 | Davis et al. |
| 6,515,221 B1 | | 2/2003 | Varga |
| 6,648,274 B1 | | 11/2003 | Bailey et al. |
| 6,681,649 B2 | | 1/2004 | Hyde et al. |
| 6,729,580 B2 | | 5/2004 | Shultz |
| 7,185,855 B2 | | 3/2007 | Peck |
| 7,367,529 B2 | | 5/2008 | Jacobs et al. |
| 2004/0035229 A1 | | 2/2004 | Meffe |
| 2004/0140401 A1 | | 7/2004 | Yamashita |
| 2006/0230847 A1 | | 10/2006 | Hewatt |
| 2008/0035797 A1 | | 2/2008 | Defendini et al. |
| 2008/0251646 A1 | | 10/2008 | Heiberg |
| 2009/0039202 A1 | | 2/2009 | Ogo et al. |

FOREIGN PATENT DOCUMENTS

FR  2907423 A1  4/2008

* cited by examiner

US 8,312,782 B2

CONTROL MOMENT GYROSCOPE BASED MOMENTUM CONTROL SYSTEMS IN SMALL SATELLITES

PRIORITY CLAIMS

This application claims the benefit of U.S. Provisional Application No. 61/218,291, filed Jun. 18, 2009, and U.S. Provisional Application and is herein incorporated by reference in its entirety.

STATEMENT REGARDING FEDERALLY SPONSORED RESEARCH OR DEVELOPMENT

This invention was made with Government support under Contract FA9453-08-C-0247 awarded by the United States Air Force. The Government has certain rights in this invention.

BACKGROUND

Improved attitude agility in small satellites increases their value by improving their data collection rate and increasing the time available for transmission of that data to the ground. This is so because a time lag exists as the satellite progresses from one attitude to another for collection or transmission of the data. The longer the progression time, the shorter the time available for data collection and transmission.

The current state-of-the art in agile small satellites allows for slew rates of less than 1°/sec. More agility in small satellites allows for new missions that were previously unachievable such as synthesized large aperture imaging, moving ground force tracking, missile tracking, tactical imaging, space superiority and space situational awareness. These new missions may need slew rates of 2°/min and faster.

In the art, reaction wheel assemblies (RWA) have been used to control attitude in smaller satellites and produce slew rates in a vehicle of 2°/min or faster. However, RWA's have an inherently low torque producing capability and may take over 60 seconds to accelerate a small satellite to this slew rate, which is unacceptably long.

Control Moment Gyroscopes (CMG) are presently the only non-expendable actuators capable of supplying high torque (i.e. equal to or greater that 1 N-m) to achieve an acceptably high slew rate. However, because of their size (approx. 16" disk diameter), their relatively large mass and their power consumption, these devices have historically been impractical for use with small satellites (i.e. <400 kg). As a minimum, three gyros are used to control the attitude of a satellite. Therefore, CMG size is an issue. As such, there is a need for a CMG of smaller dimensions with low power consumption, while at the same time producing sufficient torque to provide sufficient attitude agility.

BRIEF SUMMARY

It should be appreciated that this Summary is provided to introduce a selection of non-limiting concepts. The embodiments disclosed herein are exemplary as variations in the novel various features of the subject matter disclosed herein may be numerous. The discussion herein is limited to a specific exemplary system for the sake of clarity and brevity.

An apparatus to control the attitude of a spacecraft is provided. The apparatus includes at least three control moment assemblies (CMAs) rigidly mounted within an enclosure, each CMA mounted in an orientation whereby the longitudinal axis of each CMA is one of orthogonal and inversely parallel in relation to each other. Each CMA comprises a momentum rotor configured to rotate about a first axis and a spin motor comprising a motor rotor and a non-ferric motor stator. The non-ferric motor rotor rotates about the first axis and has a first end and a second end, the first end being coaxially affixed to the momentum rotor. The Apparatus also includes a bearing concentric with the first axis in which the second end is enjournalled.

A self-contained momentum control system for a spacecraft is also provided. The self-contained momentum control system includes a hermetically sealed enclosure, a compartment adjoined to the hermitic enclosure, and at least three control moment assemblies (CMAs) rigidly mounted within the enclosure. Each CMA is mounted in an orientation whereby the longitudinal axis of each CMA is one of orthogonal and inversely parallel in relation to each other. An electronics package is mounted in a separate compartment adjoining the enclosure, the electronics package is configured to interface command and control signals with and to provide power to the at least three CMAs. A plurality of shock isolation devices securing each of the at least three CMAs to the enclosure is also included.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

The following disclosure describes a momentum control system (MCS) for small spacecraft. It is well known in the art that a minimum of three gyroscopes are required to fully control the attitude of an object in space such as a satellite. A gyroscope operates by spinning a momentum rotor mounted within in a gimbal thereby creating an angular momentum within the rotor. By Newton's first law of motion, the rotor maintains a constant velocity until an outside force imparts energy that changes the direction or magnitude of the velocity. Conversely, by applying a force against a rigidly mounted spinning gyro, the gyroscope creates an equal and opposite reactive force which changes the attitude of the satellite to which the gyroscope is secured. By using at least three gyros simultaneously, a reactive force may be created in three dimensions to change the attitude of a satellite to any desired attitude. Historically this has been done by communicating three distinct gimbal rate commands from a flight computer, one to each gyroscope.

The subject matter disclosed herein provides for a high torque momentum control gyroscope system featuring reduced power consumption relative to legacy systems. By replacing the traditional ferric motor stator of the gyro spin motor of a CMA with a non-ferric motor stator interacting with permanent magnets integrated with the rotor at the motor stator inner and outer diameters, the momentum rotor may be driven to rotational speeds at least four times faster than current speeds of legacy systems. Rotational speeds can range upwards from 23,000 rpm. The increase in speed allows the size of the rotor to be reduced by a similar factor of about four, thereby allowing a smaller size rotor to produce the same amount of inertia. The smaller rotor mass also allows the use of a smaller support structure. A non-limiting example of a non-ferric motor stator may be a ceramic motor stator.

Further, size reduction in a CMA may be achieved by utilizing a plurality of shock absorbers by which to suspend and isolate the CMAs from a vehicle frame in order to reduce the launch load on the CMA. A reduced launch load on a CMA rotor permits the use of smaller rotor spin bearings which in turn reduce drag torque caused by those spin bearing within the CMA and further reduces power consumption. Reduced launch loads also allow for the use of an even smaller and lighter CMG support structure.

Figure 1:
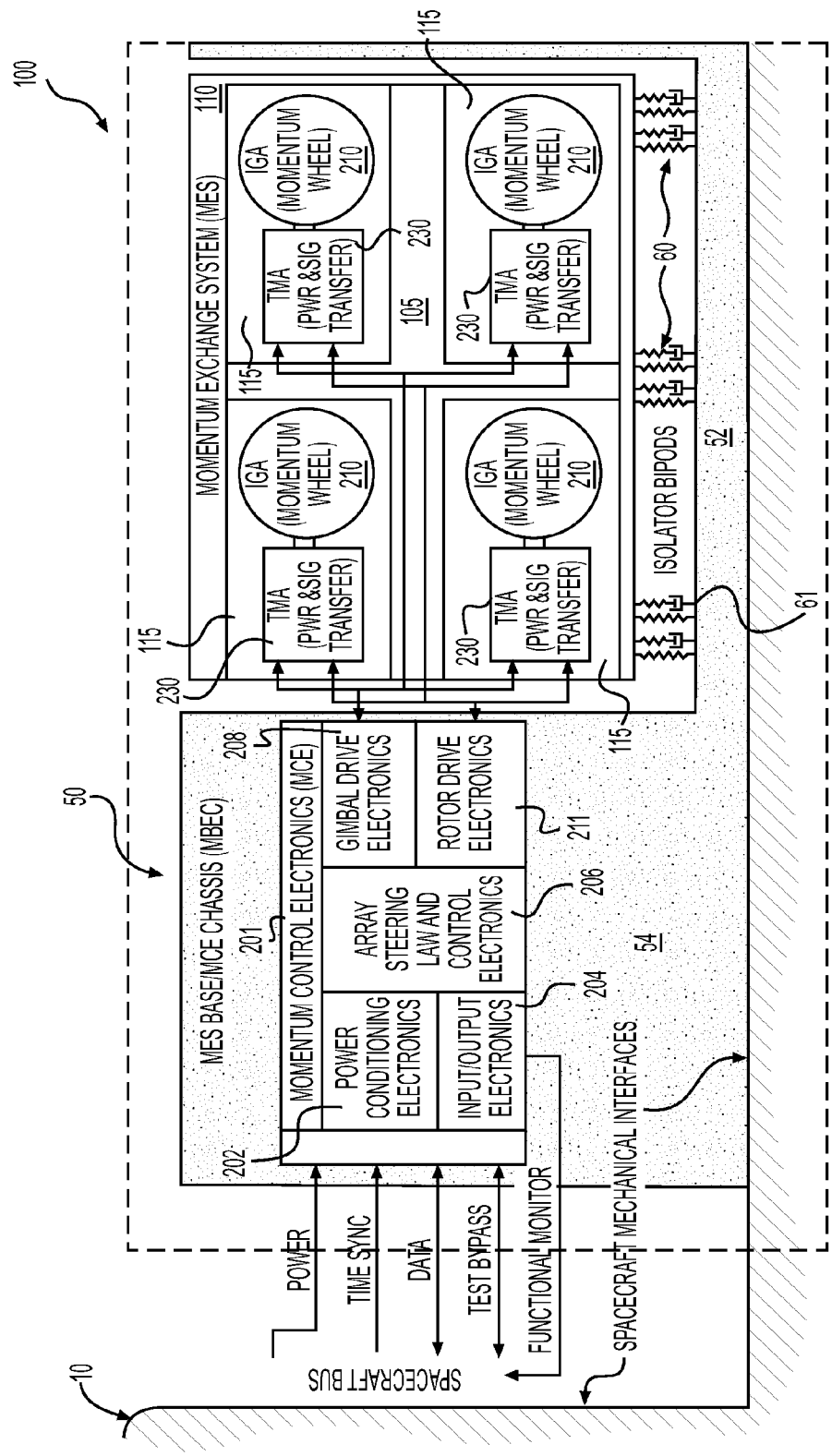
FIG. 1 is a functional block diagram of an exemplary embodiment of a satellite momentum control system.

FIG. 1 is a functional block diagram of an exemplary embodiment of a momentum control system (MCS) 100. The MCS 100 may be mounted to a spacecraft structure 10 via a momentum exchange subsystem (MES) base 52 and an MCS control electronics (MCE) chassis 54. Together the MES base 52 and the MCE chassis 54 are referred to as the MES base/MCE Chassis (MBEC) 50.

In the particular embodiment illustrated in FIG. 1, the MBEC 50 preferably incorporates a hermetically sealed enclosure in which a MES 110 is mounted. The MES 110 may comprise four substantially identical control momentum assemblies (CMA) 115, a unitary support structure 105 securing the CMAs, and a plurality of shock absorbers 60 and their attachment points 61. Each CMA 115 within the MES 110 includes a CMG. The MES 110 may be secured to the MBEC 50 via the unitary support structure 105 by the plurality of shock isolators 60. Additional information concerning an exemplary, non-limiting shock isolator 60 that is suitable for this purpose may be found in Honeywell patents U.S. Pat. Nos. 5,918,865, 5,332,070, and 7,182,188, which are herein incorporated by reference in their entirety.

In other embodiments, there may be as few as three CMAs 115 installed within an MES 110 or there may be more than four CMAs for redundancy and backup purposes. Although described herein as preferably being mounted within the MBEC 50, MES 110 may be affixed directly to the spacecraft structure 10 or to some other suitable intermediary sub-structure of the spacecraft. A non-limiting exemplary physical implementation of the MBEC 50 is illustrated in more detail in FIG. 2. An exemplary, non-limiting example of the unitary support structure 105 is more finely presented in FIG. 3.

Figure 2:
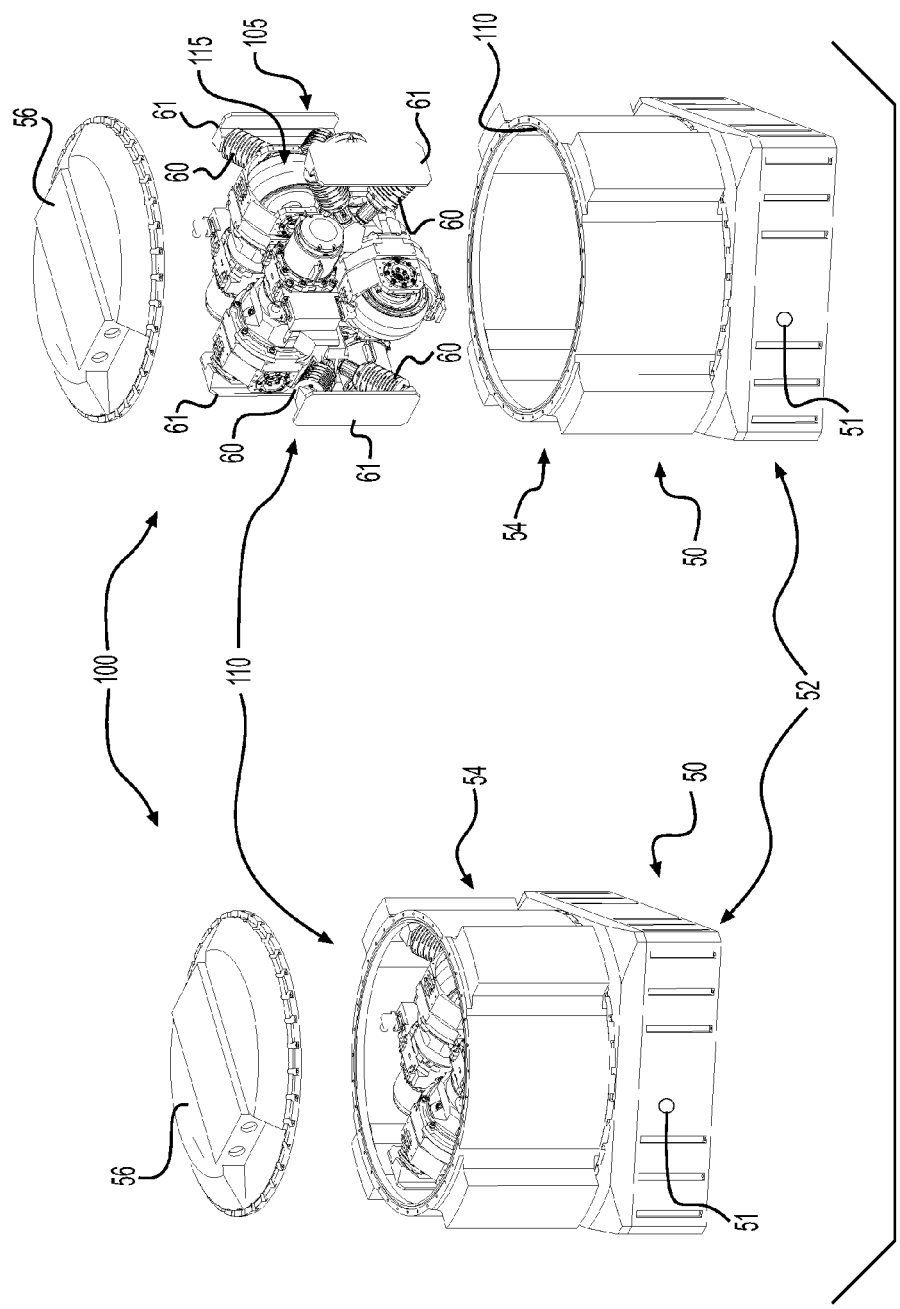
FIG. 2 is an exploded view of an exemplary embodiment of a satellite momentum control system.
Figure 3:
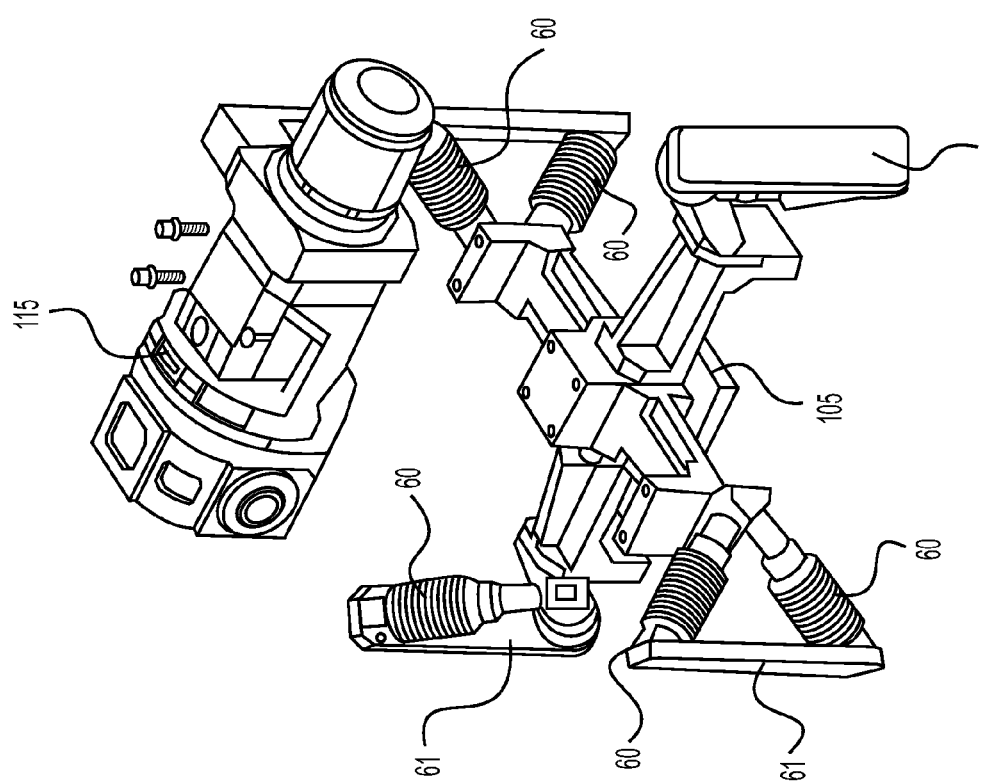
FIG. 3 is a depiction of an exemplary mounting structure for a plurality of control moment gyro mechanical assemblies (CMA's)

FIG. 2 is an exploded view of an exemplary MBEC 50. As noted above, the MBEC 50 preferably incorporates a hermetically sealed enclosure that may hold a vacuum in a pressurize environment or be pressurized in an evacuated environment. If pressurized, a helium gas is preferably used as the pressurizing gas. The MBEC 50 includes the MES base 52, the MCE chassis 54 and a cover 56. As discussed above, the MES 110 may comprise three or more CMA's 115. FIG. 1 illustrates an exemplary embodiment comprising four CMAs 115. However, one of ordinary skill in the art will recognize that at least three CMAs 115 are required for spacecraft attitude control in three dimensions although any number may be utilized for back up, redundancy, singularity avoidance and other purposes. A preferred embodiment of a CMA 115 will be described below.

Figure 4:
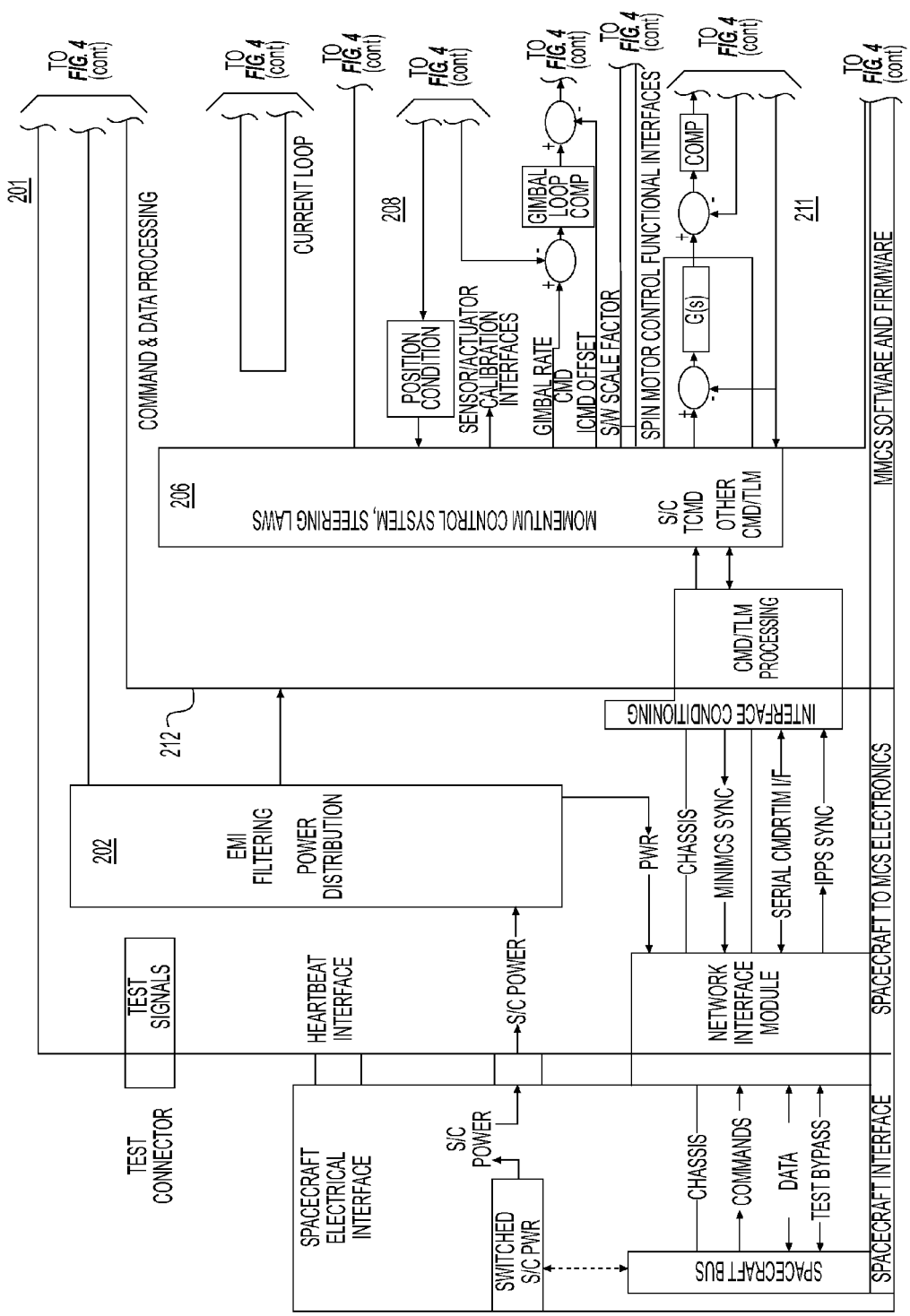
FIG. 4 is a functional block diagram of an exemplary MCS Control Electronics (MCE)
Figure 4:
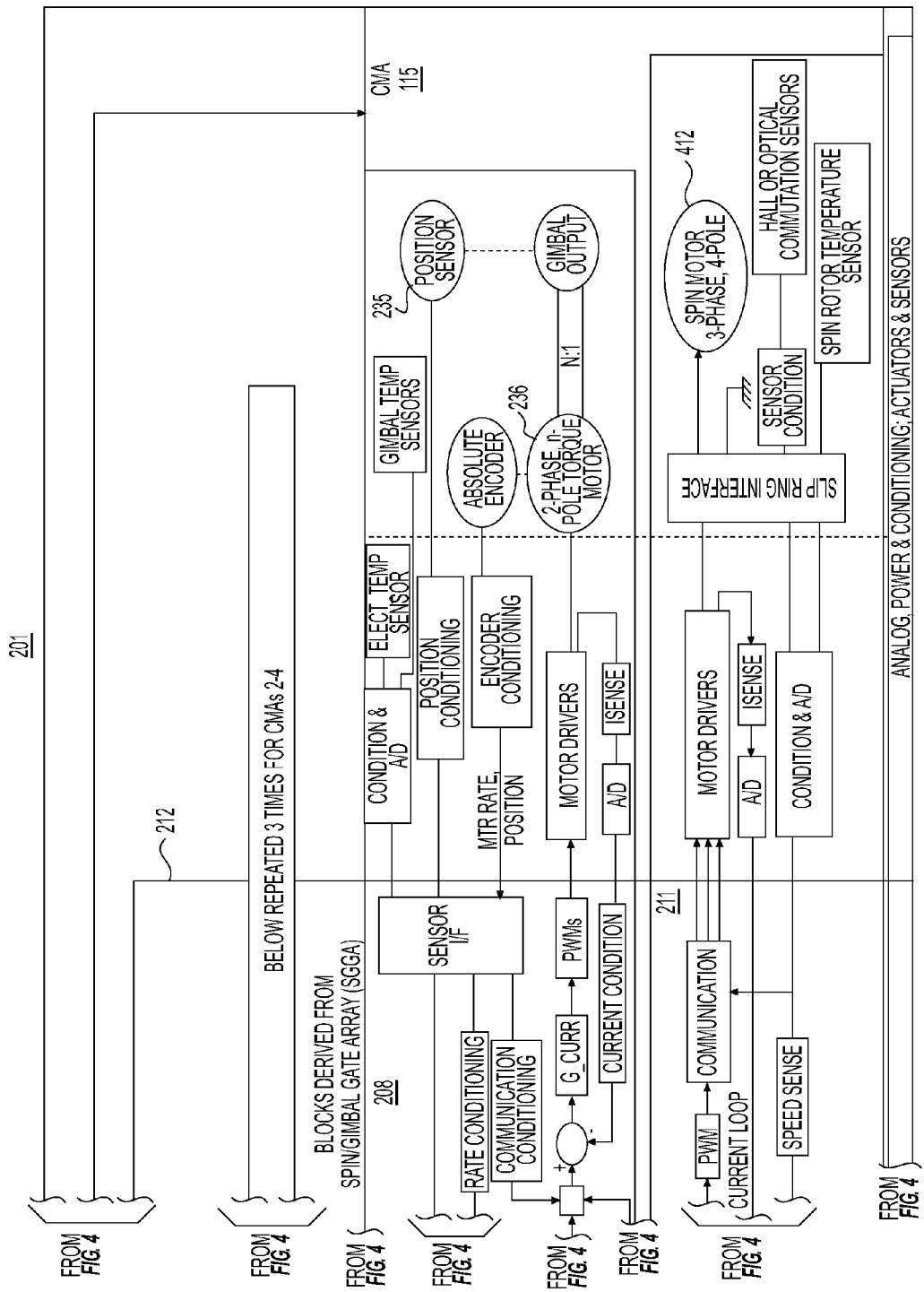

In some embodiments, the MES base 52 may also house a Momentum Control Electronics (MCE) module 201, an embodiment of which will now be described. FIG. 4 is an exemplary functional block diagram of the MCE 201. The MCE 201 is configured to control the operation of the MES 110, and may comprise a power conditioning electronics module 202, an input/output electronics module 204, an array steering law and control electronics module 206, a gimbal drive electronics module 208 and a rotor drive electronics module 211.

The power conditioning electronics module 202 converts spacecraft generated power to levels required by the MCS 100 electronics. For example, in some embodiments 28v DC power is converted into 12v and 5v DC power. The power conditioning electronics module 202 also filters out any electrical noise that may be present from other systems in the spacecraft.

The input/output electronics module 204 provides signal conditioning for internal analog and digital signals transmitted to various components and sub-components within the MCS 100 such as motor drives, thermisters, encoders, etc., as may be known in the art. The input/output electronics module 204 may also provide output signals to a functional monitor (not shown) aboard the spacecraft.

The CMG array steering law and control electronics module 206 executes instructions that are recorded on a computer readable storage medium that, when executed by a processor, coordinates the gimbal motion of the CMAs 115 within the MES 110 to produce a desired resultant torque to rotate the spacecraft. The instructions process a torque command that is supplied from the spacecraft (or an operator), and the response generates and supplies individual coordinated gyro rate commands simultaneously to each CMA 115, via the gimbal drive electronics module 208 and the rotor drive electronics module 211. By consolidating the CMG steering law and control electronics within the MCS 100 itself, the size and weight of the MCS may be further reduced by eliminating otherwise redundant electronic components. The steering law also reduces the spacecraft level integration and testing required. Additional disclosure concerning steering laws, singularity avoidance logic and their related signal processing may be found in co-owned, co-pending application Ser. No. 11/291,706 and U.S. Pat. No. 6,128,556 which are herein incorporated by reference in their entirety.

The gimbal drive electronics module 208 controls the gimbal positions of the various CMA's 115 by controlling the rotation rate of a gimbal motor shaft 232 via a gimbal motor rotor 236 in each CMA. In some embodiments the gimbal motor 233 may be a 2-phase electric motor with a 50:1 harmonic drive 237 (See, FIG. 7).

The rotor drive electronics module 211 controls a momentum rotor 410 to maintain a constant speed and therefore a constant inertia. To implement this, the rotor drive electronics module 211 is preferably implemented using a negative feedback loop that maintains the momentum rotor speed at approximately 23,000 rpm by controlling power to a rotor spin motor 412 that is coupled to the momentum rotor 410 (See FIG. 5).

In some embodiments, the CMG array steering law and control electronics module 206, the gimbal drive electronics module 208, and the rotor drive electronics module 211 may be consolidated into a single controller 212 (See, FIG. 4) per CMA 115. In such embodiments, each controller 212 receives torque commands from a flight computer and generates a gimbal rate command to the associated CMA 115. In other embodiments, the multiple CMAs 115 may be controlled by a single controller 212 by combining all CMA controllers into a single programmable logic device, such as field programmable gate arrays (FPGA). Combining controllers allows a single torque command input from a flight computer to generate discrete gimbal rate commands to each CMA 115. Integrating the controllers also reduces space and power requirements. The controller 212 may be any suitable controller and may be a low bandwidth controller, a bandpass controller or a high bandwidth controller. All or some of the controllers 212 may operate in conjunction with one or more processors (not shown). The processors may be any suitable type of processor and may be a single processor, multiple processors operating in concert, a parallel processor, a general processor or a special purpose processor. One of ordinary skill in the art will recognize that a programmable logic device a controller and a processor are each an example of a computer readable storage medium.

The MES 110 is installed into a single MBEC 50. Such a configuration not only conserves space, but allows all of the CMA's to be evacuated (i.e. the removal of atmospheric gasses) in a single operation, instead of multiple operations. Further, the single MBEC 50 allows helium, or other inert gas, to be inserted into the MES via a gas port 51 (See, FIG. 2). The inert gas mitigates heat build up within the CMAs 115 by creating convection within the MBEC 50. Heat build up may result from a number of sources including, but not limited to, friction, solar radiation, motor losses, bearing drag and conduction.

Figure 5:
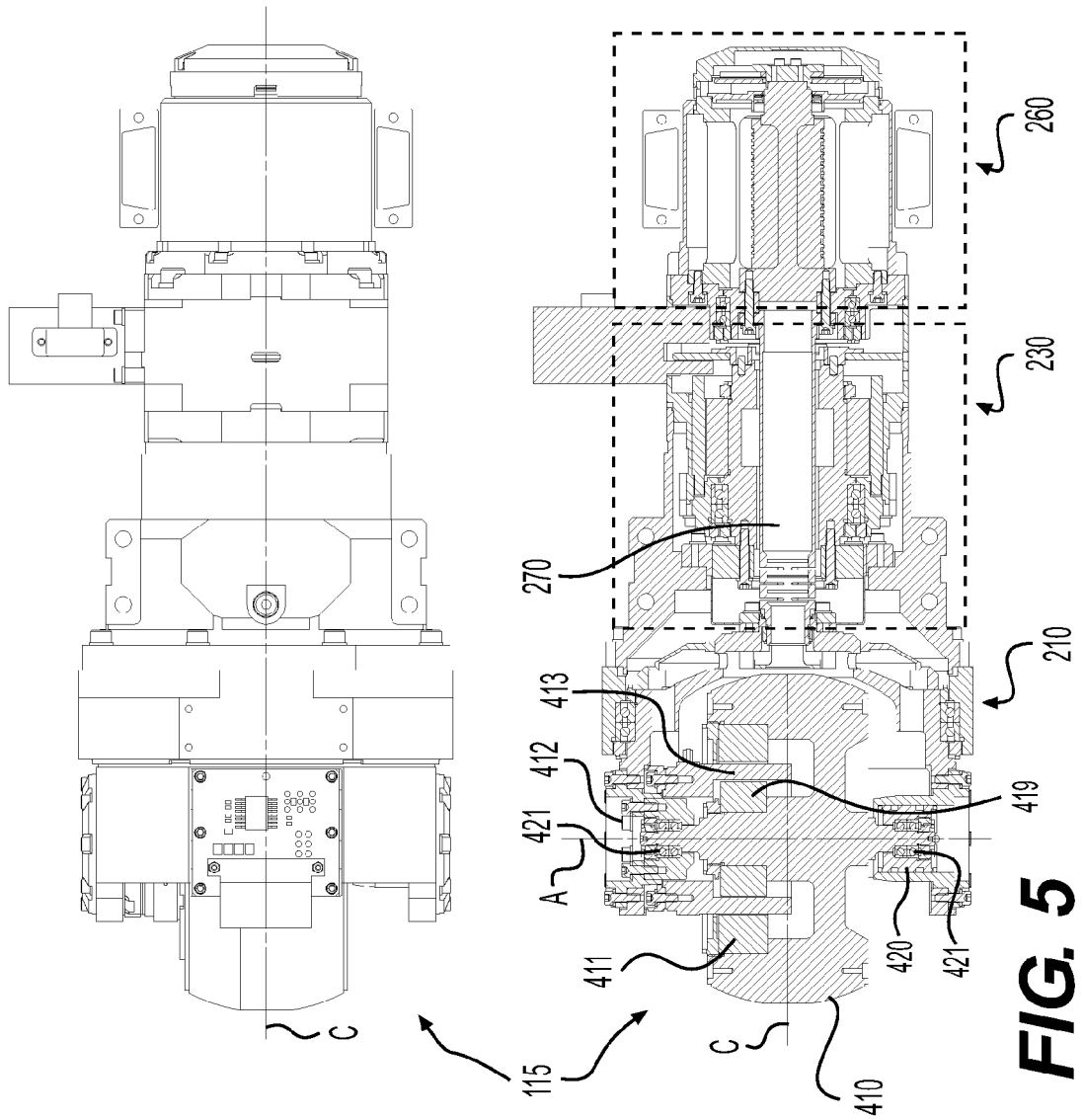
FIG. 5 is a cross sectional view of an exemplary CMA.

FIG. 5 provides a side view and a cross sectional side view of an assembled CMA 115. Each CMA 115 comprises an inner gimbal assembly (IGA) 210, a torque module assembly (TMA) 230 and a signal module assembly (SMA) 260. The CMA 115 is integrated via the external structures of the IGA 210 and TMA 230, a harmonic drive between the TMA 230 and the output of the IGA 210, and a flexible cable conduit, or a flexible spline 270, connecting the IGA 210 and SMA 260. The flexible spine 270 is preferably milled from a single piece of steel bar stock with one end having a spring like configuration to accommodate a small amount of flex and expansion along the longitudinal axis (C) of the CMA 115.

In the non-limiting, exemplary depicted embodiment, the entire length of the CMA 115 is approximately 11.25 inches and is approximately 4 inches in diameter at its widest point. One of ordinary skill in the art will recognize that the size of the CMA 115 may be scaled to accommodate varying momentum and torque requirements.

Figure 6:
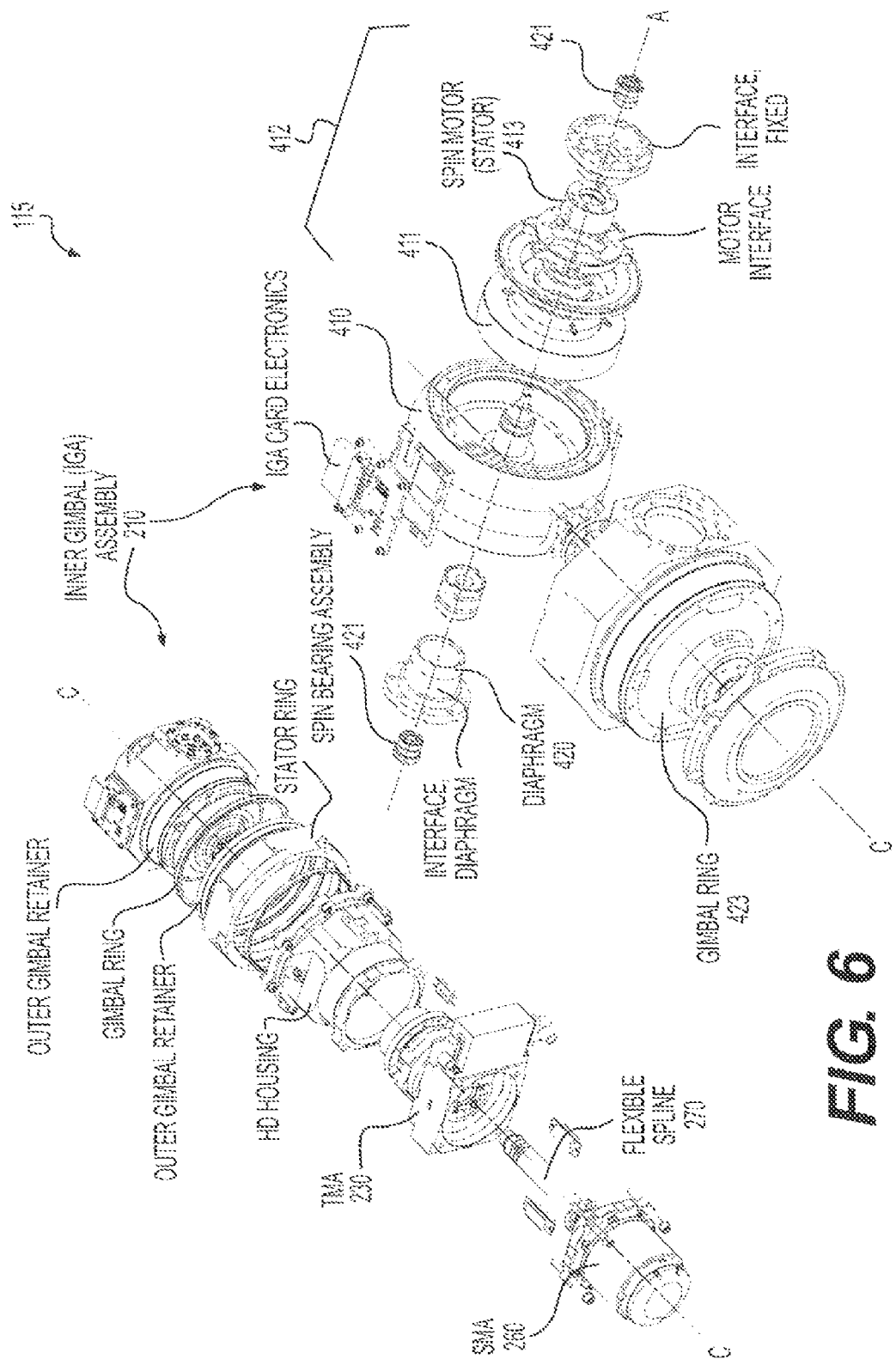
FIG. 6 is an exploded view of an exemplary CMA.

FIG. 6 provides an exploded view of a CMA 115. Each of the three major assemblies (IGA 210, TMA 230 and SMA 260) will be discussed in turn. It should be noted that various structural components such as housings, interfaces, rings, and retainers are labeled as such for reference and for completeness, although they will not be discussed herein below. Such structural elements aid in the transfer of torque to the unitary support structure 105.

Referring to FIGS. 5 and 6 together, it is seen that the IGA 210 comprises the rotor spin motor 412, which further comprises the momentum rotor 410, the spin motor rotor 411, the spin motor stator 413 and other structural components. The spin motor rotor 411 may be attached to the momentum rotor 410 or may be embedded into the momentum rotor 410. The spin motor rotor 411 is driven by the spin motor stator 413. The momentum rotor 410 is rotationally mounted within the spin bearings 421 and rotates about an axis (A) that is disposed perpendicular to the longitudinal axis (C) of the CMA 115. In some embodiments the rotor spin motor 412 may be a 3-phase, 4-pole DC motor with a non-ferric motor stator.

At least one of the spin bearings 421 is held in place by a diaphragm 420. The diaphragm 420 is an annular metallic disk that accepts the spin bearing 421 through a hole (not shown) machined through the center of the annular diaphragm 420. The diaphragm 420 rigidly holds the spin bearing 421 in place laterally. However, longitudinal movement of the spin bearing 421 is accommodated by the flexing of the annular diaphragm 420 in the longitudinal direction along axis A. The diaphragm 420 may be physically tuned (e.g. stiffened) by selecting different thicknesses and different material for fabrication. The diaphragm 420 therefore acts a longitudinal vibration isolator for the momentum rotor 410 and accommodates thermal expansion. Because the momentum rotor 410 spins at rotational rates at or greater than 23,000 rpm, the vibrations and their harmonics exist at very high frequencies and therefore may be absorbed by a smaller sized annular diaphragm 420.

In the exemplary depicted embodiment, the momentum rotor 410 is approximately four inches in diameter and is approximately two and one half inches thick but may be scaled in size as may be necessary for a particular application. Conventional momentum rotors have been significantly larger than four inches in diameter and have rotated at angular velocities ($\omega$) in the vicinity of 6000 rpm in order to produce the proper amount of angular momentum (H) according the formula $$H = I\omega.$$

Therefore, in order to maintain the same level of angular momentum while reducing the size (i.e. moment of inertia (I)) of the of the momentum rotor 410, the angular velocity ($\omega$) must be increased proportionally. As an example, reducing the diameter of the momentum rotor 410 (i.e. it's mass) by a factor of four would require the angular velocity be increased by a similar factor resulting in a much higher angular velocity (e.g. 23,000-24,000 rpm). One of ordinary skill in the art will recognize that the required increase in angular velocity depends on the specific geometry and the material composition of the momentum rotor 410 and the spin motor rotor 411. The momentum rotor 410 itself may be made of any suitable metallic substance such as titanium or steel.

Conventionally, reaching the required higher angular velocities has proven elusive as conventional spin motors require exponentially more power at higher speeds due to the natural occurrence of back electro-motive force (EMF) in the ferric motor stators of heritage rotor drive motors. A back electro-motive force develops in an electric motor from circular flows of electrons in a conductor (i.e. eddy currents) due to changing magnetic fields that result from relative motion between the conductive motor stator and the magnetic field source from the stator.

Eddy currents produce magnetic fields in the opposite direction from those in the spin motor rotor 411 thereby partially canceling out the electric field created by the spin motor stator 413 driving the spin motor rotor 411. Therefore, the power necessary to increase angular velocities to levels required by a smaller rotor mass increases exponentially to overcome the eddy currents developed in a ferric rotor motor stator. Such high power requirements make the use of heritage CMA spin motors impractical.

In order to minimize back electro-motive force even further, Litz wires may be used as the motor stator windings (419). Litz wires are specially constructed cables comprised of small individually insulated wires physically arranged so as to minimize any back EMF that may occur in the windings themselves. The winding of the Litz wires around the motor stator may be done in any suitable fashion. An exemplary winding may be found in co-owned U.S. Pat. No. 7,061,153 B1 and is herein incorporated by reference in its entirety.

Figure 7:
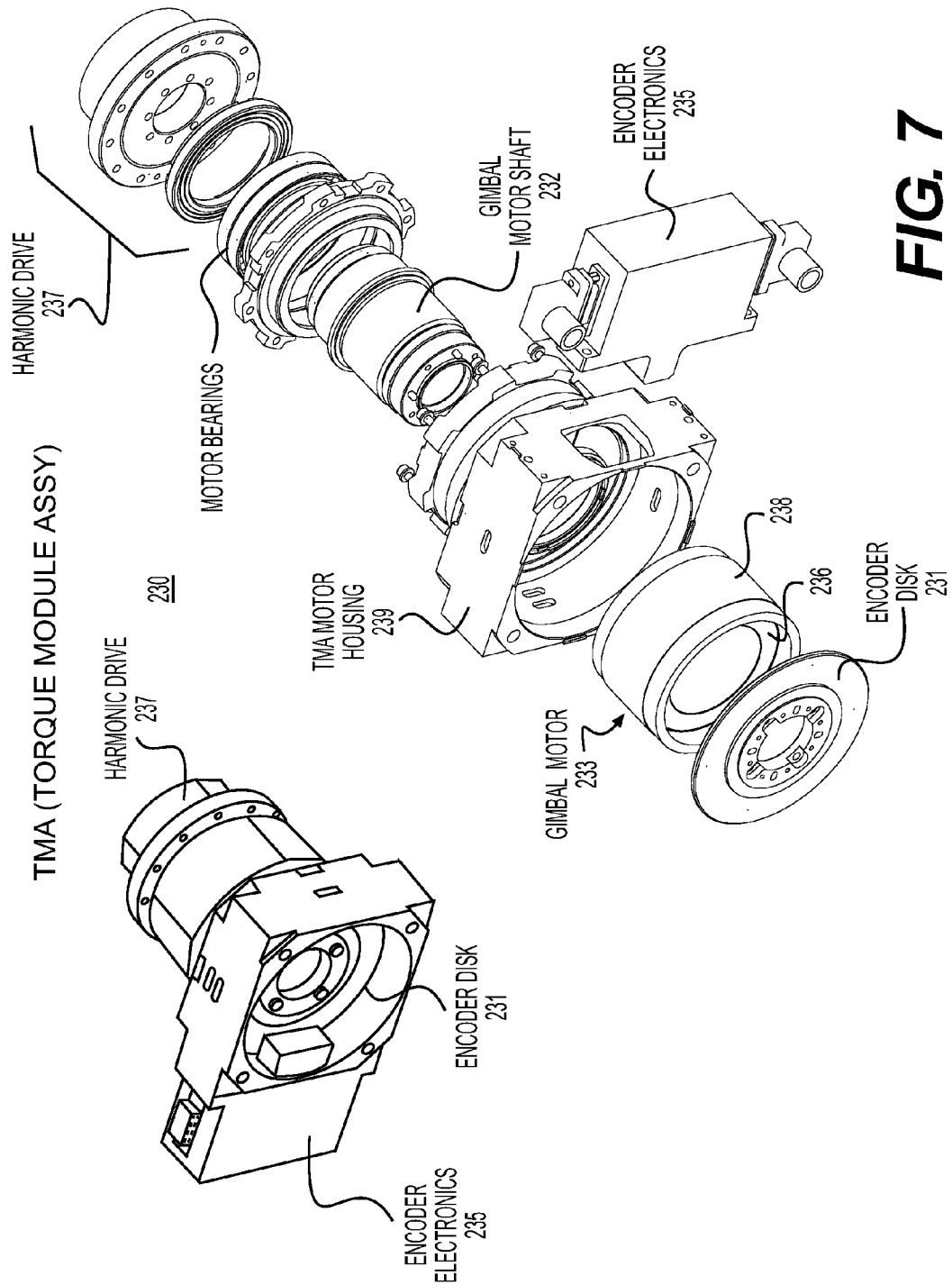
FIG. 7 is an exploded view of an exemplary Torque Motor Assembly (TMA)

FIG. 7 provides an exploded view of an exemplary TMA 230 which includes a gimbal motor 233 and its housing assembly, a 50:1 harmonic drive 237 and an electronic encoder 235/231. The gimbal motor 233 receives a torque command from the gimbal drive electronics module 208 and in response rotates the shaft of the gimbal motor about axis C. This rotation, in turn rotates the momentum rotor 410 away from of its steady state rotational axis A. The movement from its steady state axis thereby creates a gyroscopic torque in a direction perpendicular to the axis of rotation of the momentum rotor 410 and axis C, which causes the satellite to rotate in reaction thereto. The gimbal motor 233 comprises a gimbal motor stator 238 and a gimbal motor rotor 236 which is attached to the shaft of the gimbal motor.

The TMA 230 also includes an optical encoder 231/235, which is rigidly affixed to the shaft of the torque motor. The optical encoder disk 231 is connected to the end of a gimbal motor shaft 232 adjacent the SMA 260. The optical encoder disk 231 is calibrated to the position of gimbal motor 233 and measures the absolute angular position and speed of the gimbal motor 233 which may be accurate to within 21 bits per every 360°. By extension, the optical encoder is also calibrated to the axis A of the momentum rotor 410.

The optical encoder comprises an encoder electronics module 235 and a glass optical encoder disk 231 with a uniquely encoded opaque pattern engraved thereon. A light source (not shown) passes light through the optical encoder disk. The light source is blocked by the unique encoded pattern as the gimbal motor shaft turns. One or more light sensors (269) read the shadowing cast by the unique encoded pattern as the shadows pass the light sensor(s) thereby tracking the position of the gimbal motor 233. The optical encoder thereby provides position feedback (See, FIG. 1D) to the gimbal drive electronics module 208.

On the opposite end of the gimbal motor shaft 232 from the optical encoder disk 231 and proximate to the IGA 210, is the harmonic drive 237 that drives the gimbal of the IGA 210. In some non-limiting embodiments, the gearing ratio of the harmonic drive 237 may be 50:1. However, a different gearing ratio may be found useful with momentum rotors 410 of different sizes. The harmonic drive 237 is used to drive the spinning rotor away from its steady state axis A and thereby create the desired maneuvering torque. The maneuvering torque is then translated through the torque motor stator 238 into the torque motor housing 239 and then through the various housing and support components of the CMA 115, to the unitary support structure 105, through the isolators 60 and then to the spacecraft 10.

Figure 8:
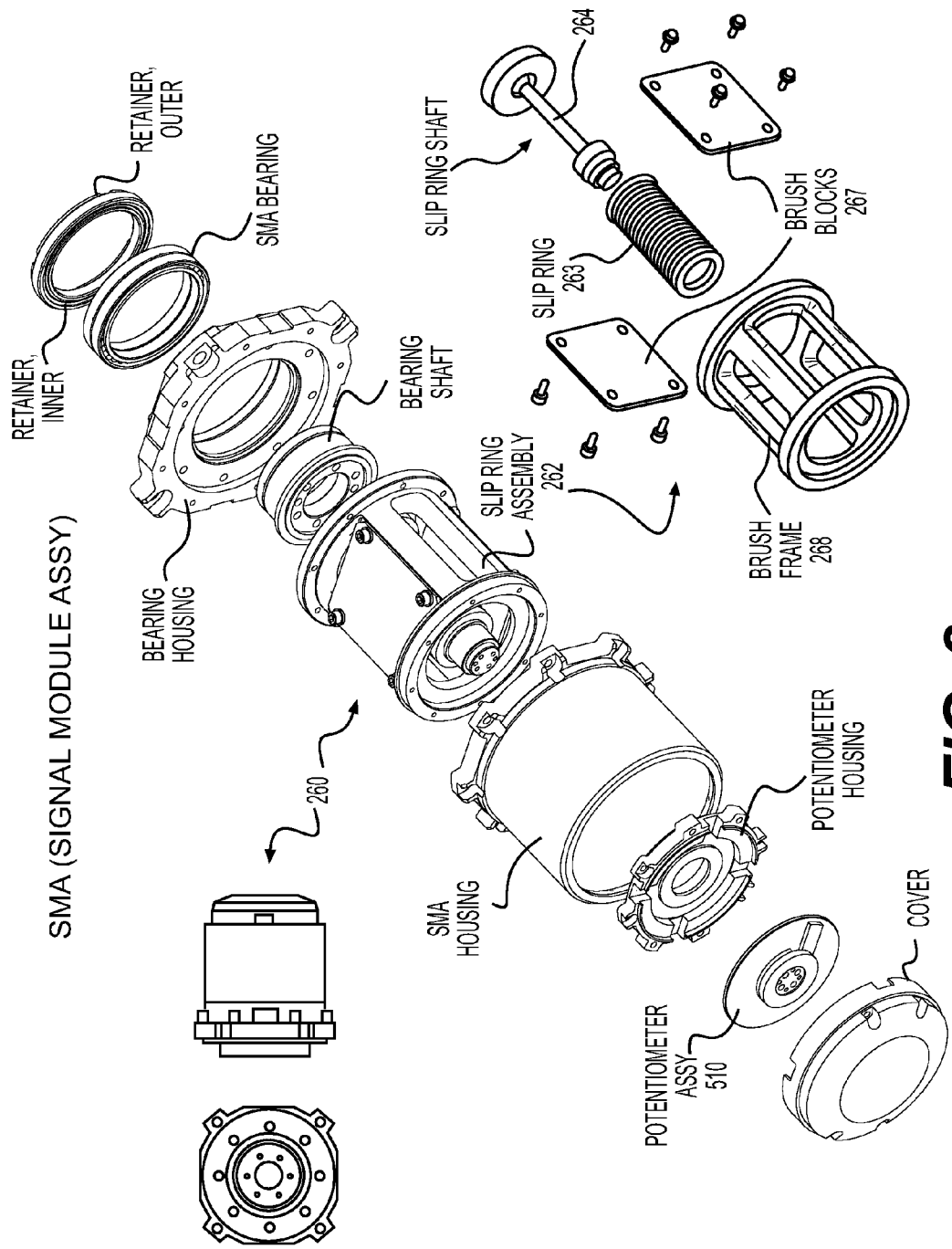
FIG. 8 is an exploded view of an exemplary Signal Module Assembly (SMA)

FIG. 8 provides an exploded view of the SMA 260. The SMA 260 houses a monofilament slip ring assembly 262 for transmitting power and controlling signals to the rotor spin motor 412 and the gimbal motor 233 (See FIGS. 3 and 4). The monofilament 263 may be comprised of any suitable substance. In some embodiments the substance may be gold.

The SMA also contains a potentiometer 510 (See, FIG. 9) which provides a coarse gimbal position indication and may also be used as a primary position sensor to determine a derived gimbal angle during initialization of a CMA 115. The potentiometer 510 may also be used as a back up gimbal position indication up for the gimbal motor 233. The potentiometer 510 comprises a dual resistive circuit 520/530. The voltage along each resistive circuit 520 and 530 varies linearly with the distance from a 5v DC power source 522/524 and is determined by one of two mechanically slideable taps 540/60 that pick off the voltage associated with the current position of the tap along each resistive circuit 520 and 530. The slideable taps are calibrated to the position of the gimbal motor shaft 232. As such, the voltage varies with the angular position of the gimbal motor 233.

Figure 9:
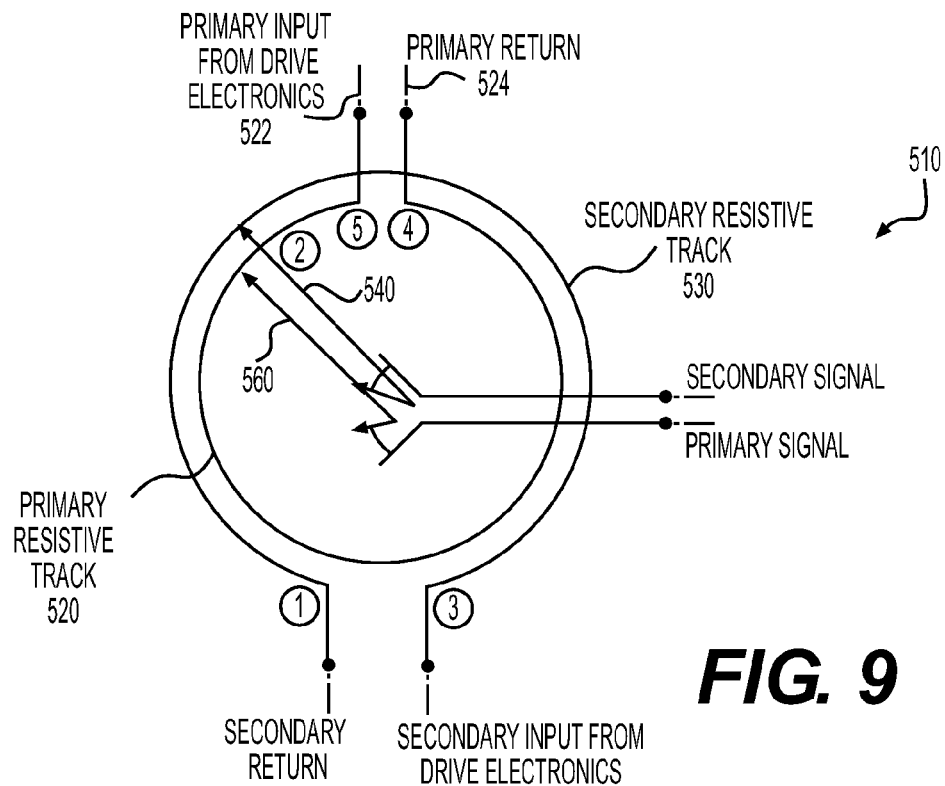
FIG. 9 is a simplified schematic of a gimbal angle position potentiometer.

As can be seen from FIG. 9, each resistive circuit 520/530 is configured as a circle to accommodate the rotation of the gimbal motor shaft 232. Each resistive circuit 520/530 contains a gap in the circle located 180° from the other to allow connection to the gimbal drive electronics module 208. The dual track design ensures that either of the primary or the secondary tap reads a voltage and provides a position indication for the full 360° rotation of the gimbal motor shaft 232.

Figure 10:
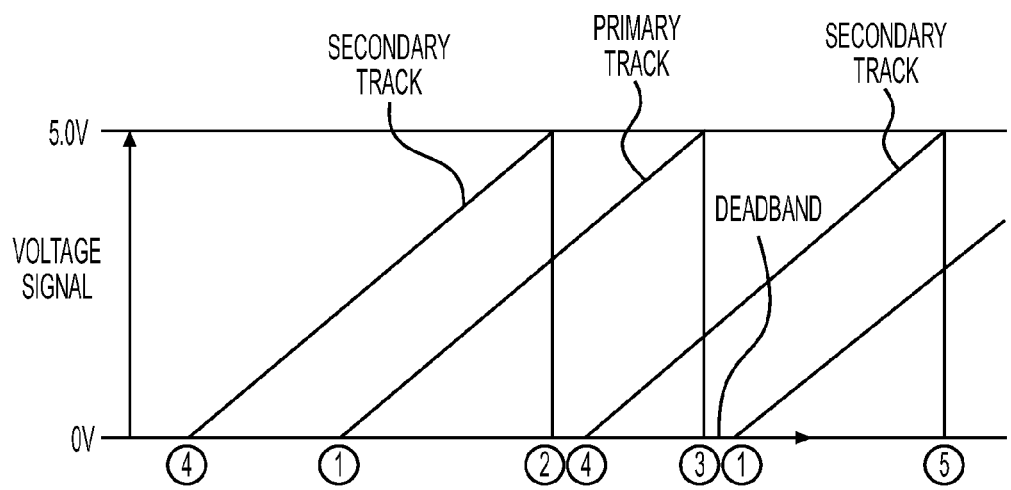
FIG. 10 is an exemplary plot of the output voltage vs. gimbal angle for the gimbal angle position potentiometer.

FIG. 10 illustrates the linear voltage readout from the potentiometer at every point along the primary tack 530 and the secondary track 520. In this particular embodiment the voltage output is a 0-5v DC. As the slideable taps 540 and 560 move clockwise beginning at point 1, the primary tap 540 is sensing a zero voltage while the secondary tap is sensing a voltage somewhat below 2.5v DC. At position 5, the secondary tap is sensing a maximum voltage of 5v DC and the primary tap is sensing a voltage of somewhat less than 2.5v DC. At point 4, the secondary tap is sensing a zero voltage and begins its linear increase. At point 3, the primary tap 540 is sensing a max voltage and the secondary tap is sensing a voltage that is somewhat less than 2.5v DC. The voltage cycle continues or reverses as the gimbal motor 233 rotates. After having read the Applicants disclosure, one of ordinary skill in the art would recognize that the voltages being sensed by the primary and secondary taps can be processed to indicate the angular position of the gimbal motor shaft 232.

The IGA 210 and the SMA 260 are connected by the flexible spline 270 (See FIGS. 5 and 6). The flexible spline 270 connects the gimbal ring 423 of the IGA 210 to the slip ring shaft 264 of the SMA 260 such that the gimbal ring 423 and the slip ring shaft 264 turn at the same rate. As mentioned above, the flexible spline 270 has one end cut into a machine spring allowing flexibility due to thermal expansion and encoder mount restrictions.

The subject matter described above is provided by way of illustration only and should not be construed as being limiting. Various modifications and changes may be made to the subject matter described herein without following the example embodiments and applications illustrated and described, and without departing from the true spirit and scope of the present invention.

We claim:

1. An apparatus to control the attitude of a space craft comprising:

an enclosure;

at least three control moment assemblies (CMAs) mounted within the enclosure, each CMA having a longitudinal axis and disposed in the enclosure at an orientation whereby the longitudinal axis of each CMA is one of orthogonal and inversely parallel in relation to each other, each CMA comprising:

a momentum rotor integrated within each CMA and configured to rotate about a second axis;

a spin motor comprising a motor rotor and a non-ferric motor stator, the non-ferric motor stator configured to induce rotation of the motor rotor about the second axis, the motor rotor and having a first end and a second end, the first end being coaxially affixed to the momentum rotor; and a bearing concentric with the first axis in which the second end is mounted.

2. The apparatus of claim 1, further comprising a coil of Litz wire enwound upon the non-ferric motor stator.

3. The apparatus of claim 1, wherein the bearing is a plain bearing comprising a flexible metallic annular diaphragm.

4. The apparatus of claim 3, wherein the flexible metallic annular diaphragm prevents lateral movement of the second end but allows at least some longitudinal movement of the second end.

5. The apparatus of claim 1 further comprising an electromagnetic gimbal motor comprising a gimbal stator and a gimbal rotor, the gimbal rotor coupled to the momentum rotor via a gimbal motor shaft and configured to rotate about the longitudinal axis wherein the second axis is perpendicular to the longitudinal axis.

6. The apparatus of claim 5, wherein the gimbal motor rotates the momentum rotor about the longitudinal axis.

7. The apparatus of claim 6, further comprising an optical encoder that is rigidly affixed to an end of the gimbal motor shaft wherein the optical encoder is calibrated with an orientation of the first axis.

8. The apparatus of claim 7 wherein the optical encoder comprises a glass disk containing a unique opaque pattern imprinted thereon whereby the angular position of the gimbal motor shaft may be determined by a photo sensor configured to detect light shining therethrough.

9. The apparatus of claim 7 further comprising a monofilament slip ring assembly attached to a second end of a flexible spline remote from the spin motor, wherein the first end is proximate to the spin motor, the slip ring assembly comprising a slip ring shaft and a brush block co-located within a frame.

10. The apparatus of claim 9 further comprising a direct current potentiometer attached to a second end of the slip ring shaft remote from the optical encoder, wherein the first end is rigidly attached to the second end of the flexible spline.

11. A self-contained momentum control system for a spacecraft comprising:
a hermetically sealed enclosure;
a compartment adjoined to the hermitic enclosure;
at least three control moment assemblies (CMAs) rigidly mounted within the enclosure, each CMA mounted in an orientation whereby the longitudinal axis of each CMA is one of orthogonal and inversely parallel in relation to each other;
an electronics package mounted within the compartment adjoined to the hermitic enclosure, the electronics package configured to interface command and control signals with, and to provide power to, the at least three CMAs; and
a plurality of shock isolation devices coupling each of the at least three CMAs to the enclosure.

12. The self-contained momentum control system of claim 11, wherein the hermetically sealed enclosure includes a port by which the hermetically sealed enclosure is evacuated and a gas inserted to institute convective cooling of the CMAs.

13. The self-contained momentum control system of claim 11, wherein the electronics package includes a steering law and singularity avoidance module configured to translate a single attitude control input into specific torque command and control signals for each of the plurality of CMAs.

14. The self-contained momentum control system of claim 11, wherein each CMA comprises:
a gimbal ring;
a momentum rotor configured to rotate about a first axis; and
an electromagnetic spin motor comprising a spin motor rotor and a non-ferric spin motor stator, the non-ferric spin motor stator enwound by a coil of wire and inducing rotation to the momentum rotor via the spin motor rotor about the first axis, the spin motor rotor having a first end and a second end, the first end being embedded in the gimbal ring, and the second end being coaxially affixed to the momentum rotor.

15. The self-contained momentum control system of claim 14, further comprising a bearing concentric with the first axis in which the second end is enjournalled.

16. The apparatus of claim 15, wherein the bearing is a plain bearing comprising a flexible metallic annular diaphragm.

17. The apparatus of claim 14 further comprising an electromagnetic gimbal motor comprising a gimbal stator and a torque rotor, the gimbal rotor configured to rotate on a gimbal motor shaft about a second axis wherein the second axis is perpendicular to the first axis.

18. The apparatus of claim 17, wherein a first end of the gimbal motor shaft rotates the momentum rotor about the second axis.

19. The apparatus of claim 18 further comprising an optical encoder that is rigidly affixed to a second end of the gimbal motor shaft wherein the optical encoder is calibrated with an orientation of the first axis.

20. The apparatus of claim 18 further comprising a monofiliment slip ring assembly attached to a second end of a flexible spline remote from the electromagnetic spin motor, wherein the first end is proximate to the electromagnetic spin motor, the slip ring assembly comprising a slip ring shaft and a brush block co-located within a frame.

* * * * *